United States Patent
Grace et al.

(10) Patent No.: US 6,335,705 B1
(45) Date of Patent: Jan. 1, 2002

(54) AUTOMOTIVE RADAR ANTENNA ALIGNMENT SYSTEM

(75) Inventors: Martin I. Grace, San Jose; Ramzi Abou-Jaoude, Santa Clara; Karam Noujeim, Mountain View, all of CA (US)

(73) Assignee: Anritsu Company, Morgan Hill, CA (US)

( * ) Notice: Subject to any disclaimer, the term of this patent is extended or adjusted under 35 U.S.C. 154(b) by 0 days.

(21) Appl. No.: 09/587,540

(22) Filed: Jun. 1, 2000

Related U.S. Application Data

(63) Continuation of application No. 09/252,492, filed on Feb. 17, 1999, now Pat. No. 6,087,995.

(51) Int. Cl.[7] .................................................. H01Q 1/32
(52) U.S. Cl. ........................ 343/703; 343/711; 342/174
(58) Field of Search .................................. 343/703, 711, 343/713; 342/174, 168, 165; 340/903; H01Q 1/32

(56) References Cited

U.S. PATENT DOCUMENTS

| | | | |
|---|---|---|---|
| 4,041,494 A | 8/1977 | Ewen et al. | 343/112 |
| 5,111,210 A | 5/1992 | Morse | 342/455 |
| 5,313,213 A | * 5/1994 | Neumann et al. | 342/165 |
| 5,314,037 A | 5/1994 | Shaw et al. | 180/169 |
| 5,646,612 A | 7/1997 | Byon | 340/903 |
| 5,977,906 A | * 11/1999 | Ameen et al. | 342/174 |

FOREIGN PATENT DOCUMENTS

| | | | |
|---|---|---|---|
| DE | PCT/DE97/02828 | 12/1997 | H01Q/1/12 |
| DE | 197 07 590 A1 | 9/1998 | H01Q/3/08 |
| GB | 9300071 | 4/1995 | H01Q/1/32 |

* cited by examiner

*Primary Examiner*—Don Wong
*Assistant Examiner*—Hoang Nguyen
(74) *Attorney, Agent, or Firm*—Fliesler, Dubb, Meyer & Lovejoy, LLP

(57) ABSTRACT

Two receive antennas integrated with power detectors are used to align the thrust vector of a vehicle to the boresite of an automotive radar antenna mounted upon the vehicle. In the system, a signal is transmitted from the radar antenna to the Radar Test System (RTS) positioned as an amplitude only interferometer for testing the radar. Signals received by the RTS antennas are provided to amplitude detectors for generation of amplitude plots of a difference signal, or alternative signal, for display. The boresite angle of the radar antenna is then adjusted until the amplitude of the difference signal, or alternative signal, reaches a minimum to align the radar antenna boresite with the vehicle thrust vector. Additional pairs of receive antennas and detectors may be used to provide boresite alignment both in azimuth and elevation.

17 Claims, 5 Drawing Sheets

AUTOMOTIVE RADAR ANTENNA ALIGNMENT SYSTEM

This application is a continuation-in-part of application Ser. No. 09/252,492, filed Feb. 17, 1999, entitled "Universal Autoradar Antenna Alignment System," now U.S. Pat. No. 6,087,995.

BACKGROUND OF THE INVENTION

1. Field of the Invention

The present invention relates to a test system used to align the boresite of a radar antenna. More particularly, the present invention relates to a test system that is used to align the boresite of an automotive radar system antenna with a mechanical reference line (e.g., the thrust vector) from a vehicle on which the radar is mounted.

2. Description of the Related Art

Recently, manufacturers have begun producing radar systems for automobiles. Such systems have been used in combination with a vehicle cruise control to form an automotive radar system. An automotive radar system transmits a signal from an antenna typically located in the grill area of an automobile. The presence of and distance to an object from the automotive radar antenna is determined from the signal reflected by the object. If an object is detected in the path of the vehicle, wheel braking or engine deceleration is applied by the automotive radar system to maintain a desired distance from the object and to prevent the vehicle from striking the object.

To assure proper performance of an automotive radar system, the device must be regularly tested. During testing, proper alignment of the automotive radar antenna boresite angle with a mechanical reference line, such as the thrust vector of the vehicle, which identifies the forward direction of travel of the vehicle must be achieved. An automotive radar antenna boresite may become misaligned due to vehicle vibrations, vehicle collisions, or other factors. The boresite angle must be properly aligned to prevent the radar system from encountering false or inaccurate readings from signals received from vehicles in adjacent lanes, and to ensure proper detection of vehicles or objects in the immediate lane.

Referring to FIG. 1, an automotive Radar Test System (RTS) includes a transponder 115 with a single antenna 110. The transponder antenna 110 is assumed to have a centerline 111 mechanically aligned to be approximately parallel to a vehicle thrust vector 190. Further, it is assumed that the transponder antenna 100 has its centerline mechanically aligned approximately with the centerline of the radar antenna 100.

Although mechanical alignment eliminates translation errors between the centerline of the receiving antenna 110 and the centerline of the radar antenna 100, the electrical boresite of radar antenna 100 can still be misaligned as illustrated by the boresite vector 195. The boresite angles formed between the boresite vector 195 and the vehicle thrust vector 190 must be set to a minimum to ensure proper operation of the radar system.

Using the system illustrated in FIG. 1, the boresite of radar antenna 100 is considered properly aligned when a signal detected by the transponder 115 is a maximum. However, the amplitude sensitivity of the transponder antenna 110 achievable using this system is undesirably low. For example, the amplitude variance is typically less than 0.5 dB per degree of boresite offset when the radar antenna has a 3 dB beam width of 7 degrees. Thus, an alignment system utilizing only a single receiving antenna in accordance with FIG. 1 is incapable of adjusting the boresite angle of an automotive radar antenna to any great precision.

SUMMARY OF THE INVENTION

In accordance with the present invention, two receiving antennas are used in an alignment system to align an automotive radar antenna boresite angle with a mechanical reference line, such as a vehicle thrust vector, using a difference signal. The system allows a radar antenna to be easily boresited to within 0.5 degrees of a mechanical reference line.

In the system, a signal is transmitted from the radar antenna to the receiving antennas placed equidistant from the centerline of the radar antenna. Signals received by the receiving antennas are provided to detectors for further processing such as the generation of amplitude plots of difference, sum*difference, or sum/difference signals for display. The boresite angle of the radar antenna is then adjusted until the amplitude of the difference, sum*difference, or sum/difference of the detected signals reaches a minimum to align the radar antenna boresite with the mechanical reference line from the vehicle.

The receiving antennas can be mounted on a test fixture on either side of the transponder and mechanically aligned prior to boresite alignment procedures so that the centerline of the transponder antenna is aligned with the centerline of the radar antenna prior to boresite adjustment. When so aligned, the centerline of the radar antenna will be approximately aligned at a midpoint between the two receiving antennas.

BRIEF DESCRIPTION OF THE DRAWINGS

Further details of the present invention are explained with the help of the attached drawings in which.

DETAILED DESCRIPTION

Figure 2:
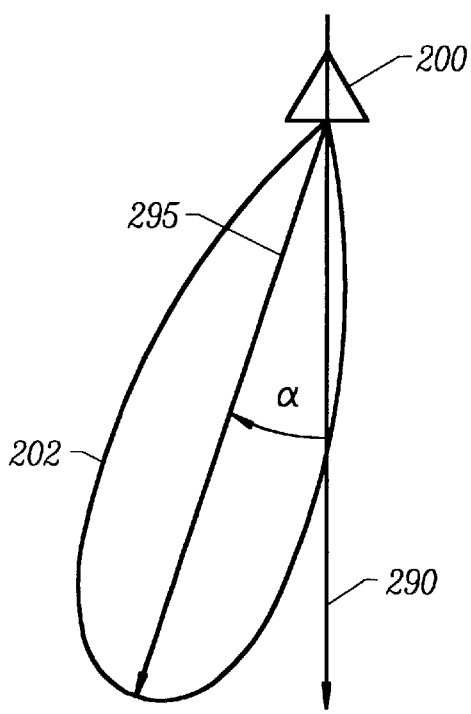
FIG. 2 illustrates the adjustment of the boresite angle of an automotive radar antenna relative to the thrust vector of an automobile using a pair of receiving antennas in accordance with the present invention.
Figure 2:
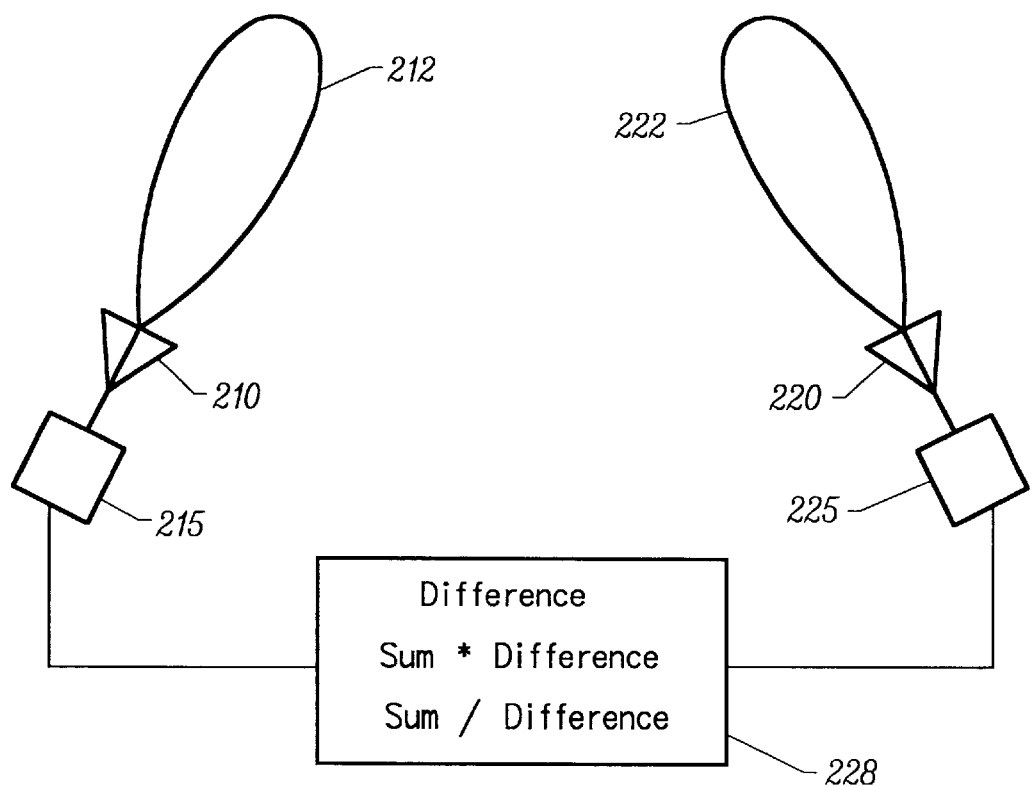

FIG. 2 illustrates a technique for aligning a boresite angle a of an automotive radar antenna 200 with a vehicle thrust vector 290 in accordance with the present invention. The RTS system of FIG. 2 effectively provides an amplitude interferometer to align a boresite 295 with a vehicle thrust vector 290.

A first receiving antenna 210 is separated horizontally by a known distance from a second receiving antenna 220. Antennas 210 and 220 are each separated from the automotive radar antenna 200 by a second known distance. For example, the antennas 210 and 220 may be separated from each other by 25 centimeters, while the distance between the antenna 200 and antennas 210 and 220 may be 1 to 2 meters.

The antennas 210 and 220 are positioned such that a line drawn from the antenna 210 to the antenna 220 is approximately perpendicular to a vehicle thrust vector 290. Antennas 210 and 220 are further positioned such that their centerlines are approximately parallel to the centerline of the radar antenna 200. The antennas 210 and 220 may be so aligned using a laser alignment system or another mechanical alignment system as described in more detail subsequently.

In accordance with the present invention, a test signal 202 is emitted from the radar antenna 200. If the boresite anglea is not equal to zero, then a first signal 212 received by the antenna 210 will exhibit a greater amplitude than a second signal 222 received by the antenna 220. Antennas 210 and 220 are in communication with a first detector 215 and a second detector 225, respectively. Signal 212 is detected by the first detector 215. Similarly, signal 222 is detected by the second detector 225. The outputs of the detectors 215 and 225 are supplied to a device 228 for providing a difference signal. The device 228 can in one embodiment be a simple subtractor. The output of the device 228 can be plotted or otherwise displayed to provide an amplitude curve.

Figure 1:
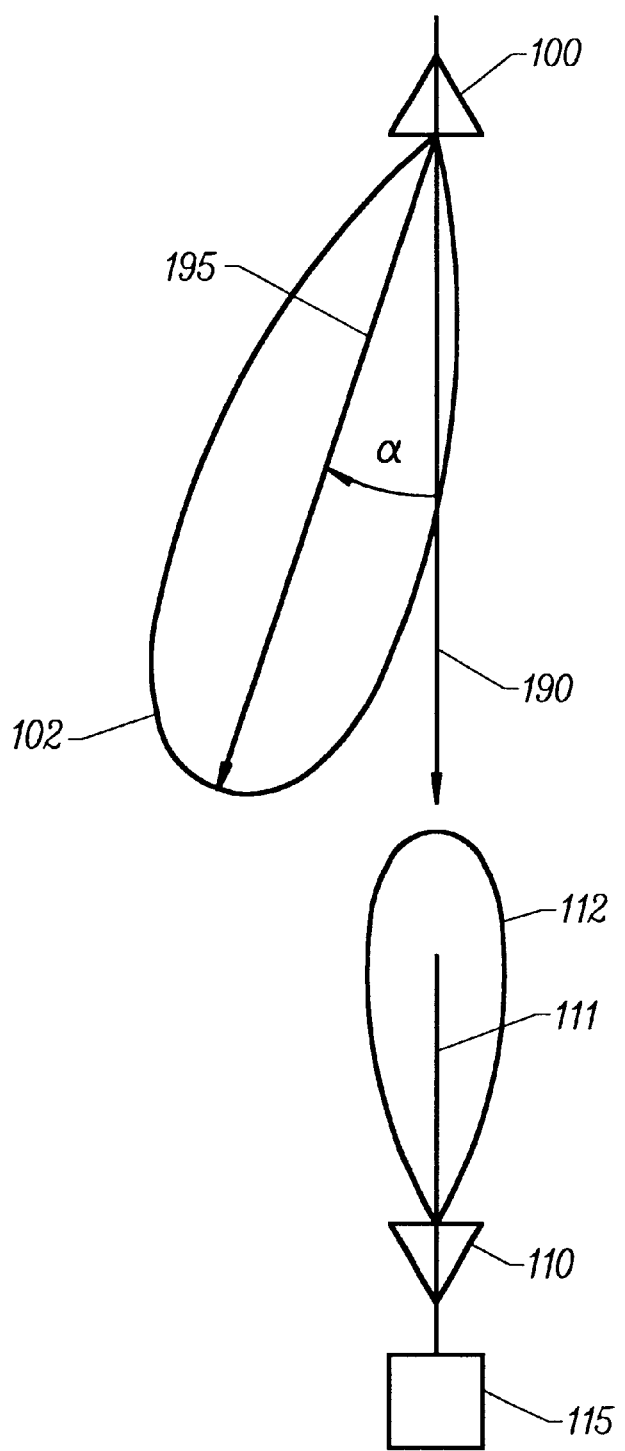
FIG. 1 illustrates the adjustment of the boresite angle of an automotive radar antenna relative to the thrust vector of an automobile using a transponder.
Figure 3:
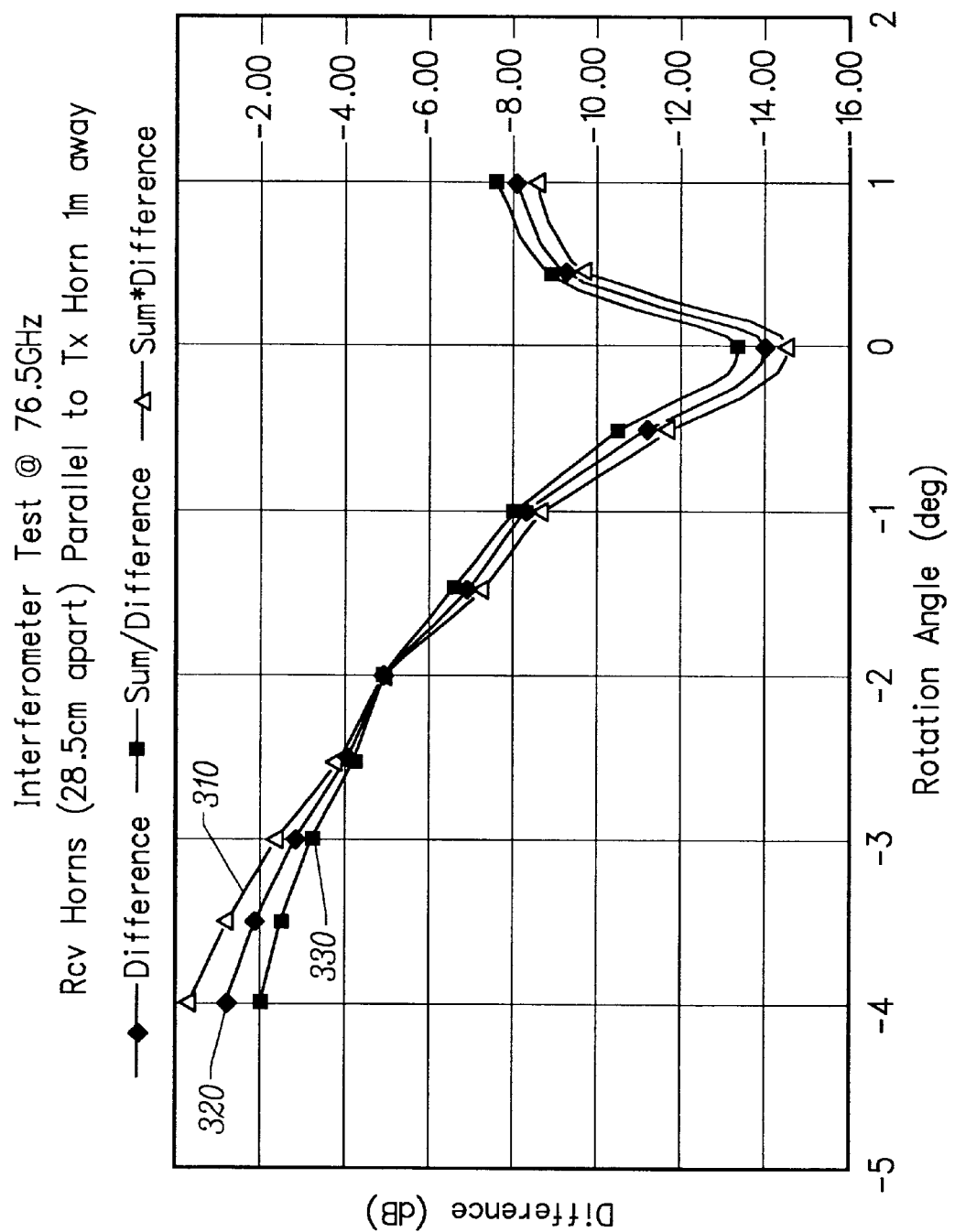
FIG. 3 shows an amplitude plot of the difference, sum/difference, and sum*difference of signals received by a pair of receiving antennas in accordance with the present invention for different rotation angle offsets of an automotive radar antenna.

Referring to FIG. 3, a first difference plot 320 is provided from device 228 when the device 228 is composed of a subtractor. Plot 320 illustrates the output of a subtractor having inputs from the detectors 215 and 225 when the test signal 202 operates at 76 GHz. The difference plot 320 reveals a difference of −14 dB when the boresite anglea (radar antenna rotation angle) equals zero degrees. Difference plot 320 also indicates a difference of −8 dB when the boresite angle $\alpha$ equals 1 degree. Thus, for a test signal of 76 GHz, a boresite angle offset of 1 degree results in an 6 dB change in the difference plot 320. Difference plot 320 reveals a "dip" in the amplitude of a subtractor output as the boresite angle $\alpha$ is adjusted toward zero degrees, from both positive and negative directions. This dip in the difference plot 320 facilitates precise adjustment of the boresite angle $\alpha$ for small rotation angles. A method in accordance with the present invention allows the boresite anglea to be adjusted more precisely within a 0.5 degree angle. This level of precision significantly exceeds the accuracy attainable using the single receiving antenna system illustrated in FIG. 1.

The device 228 of FIG. 2 may further include a summer, a subtractor, and a multiplier. Outputs from the detectors 215 and 225 can be supplied to both a subtractor and a summer. Outputs of the summer and the subtractor can then be multiplied in the multiplier to obtain a sum difference signal. The multiplier output signal can be displayed as a sum*difference plot.

Referring to FIG. 3, a sum*difference plot 310 is shown for the same radar antenna used to provide the difference plot. The sum*difference plot 310 indicates a difference of less than −14 dB at a boresite angle $\alpha$ of zero degrees. Similar to difference plot 320, the sum*difference plot 310 also reveals a dip centered around a rotation angle of zero.

The device 228 can further include a summer, a subtractor, and a divider to enable obtaining a sum/difference signal. Referring to FIG. 3, a sum/difference plot 330 is likewise shown for the same radar antenna where difference and sum*difference plots are shown. The sum/difference plot 330 indicates a difference slightly greater than −14 dB with a boresite angle $\alpha$ of zero degrees. Similar to the difference and sum*difference signals, the sum/difference plot 330 also reveals a dip in amplitude centered around a rotation angle of zero degrees.

Referring to FIG. 2, the radar antenna 200 can be adjusted in accordance with the present invention until a subtractor output signal is a minimum. This adjustment of the radar antenna 200 results in easy adjustment of the boresite angle $\alpha$ to within 0.1 degrees. The radar antenna 200 can be similarly adjusted until a multiplier output signal is a minimum. Furthermore, radar antenna 200 can be adjusted until a divider output signal is a minimum.

Figure 4:
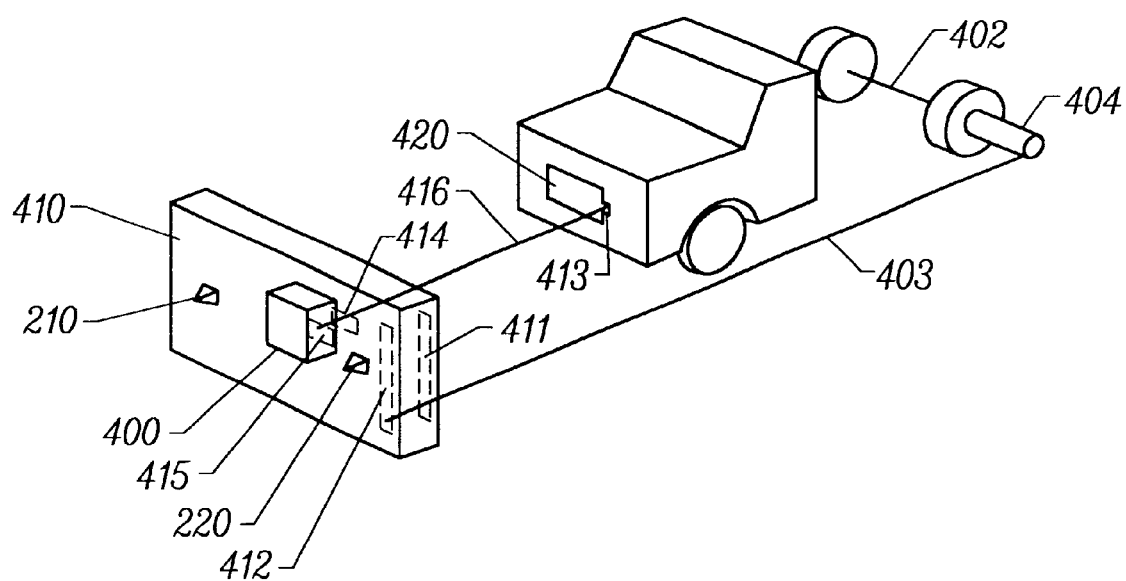
FIG. 4 illustrates an alignment fixture used for alignment of antennas used in the test system shown in FIG. 2.

FIG. 4 shows a positioning fixture 410 which may be used to position and align the receive antennas 210 and 220 with respect to the automotive radar antenna 420. In FIG. 4, the receiving antennas 210 and 220 are attached to the fixture 410 and a transponder 400 is attached to the fixture 410 along a line between antennas 210 and 220. A laser beam positioning device 404 is attached to the vehicle axle 402 and transmits a laser beam 403 which is aligned by the positioning device 404 to be perpendicular to the rear axle 402. The positioning device 404 is a component commonly used for wheel alignment. When the centerlines of the antennas 210 and 220 are approximately aligned with the vehicle thrust vector, the laser beam will be transmitted through a narrow slot 411 in the alignment fixture of the transponder 410 and will impinge upon a thin reflective stripe 412 on the back wall of the fixture 410. An operator when observing the laser beam on the reflective stripe 412 can determine when the receiving antenna centerlines are aligned with the vehicle thrust vector.

After alignment of the receiving antenna centerlines with a vehicle thrust vector, the transponder antenna centerline is further aligned with the centerline of the radar antenna. To do so a second laser beam 416 attached to the automobile at a position 413 and a reflective stripe 415 attached to the alignment fixture 410 can be used. The transponder antenna is translated mechanically to achieve the mechanical alignment before the receive antennas 210 and 220 are used to set the boresite angle $\alpha$.

As an alternative to using lasers, reflector antennas 210 and 220 can be attached to the fixture 410 and the antennas can be aligned in accordance with a user's best eyesight approximation without the use of the lasers shown in FIG. 4 to align the centerline of the transponder and radar antennas prior to adjustment of the boresite angle $\alpha$. Other alignment systems may be likewise used as might be contemplated by a person of ordinary skill in the art.

Figure 5:
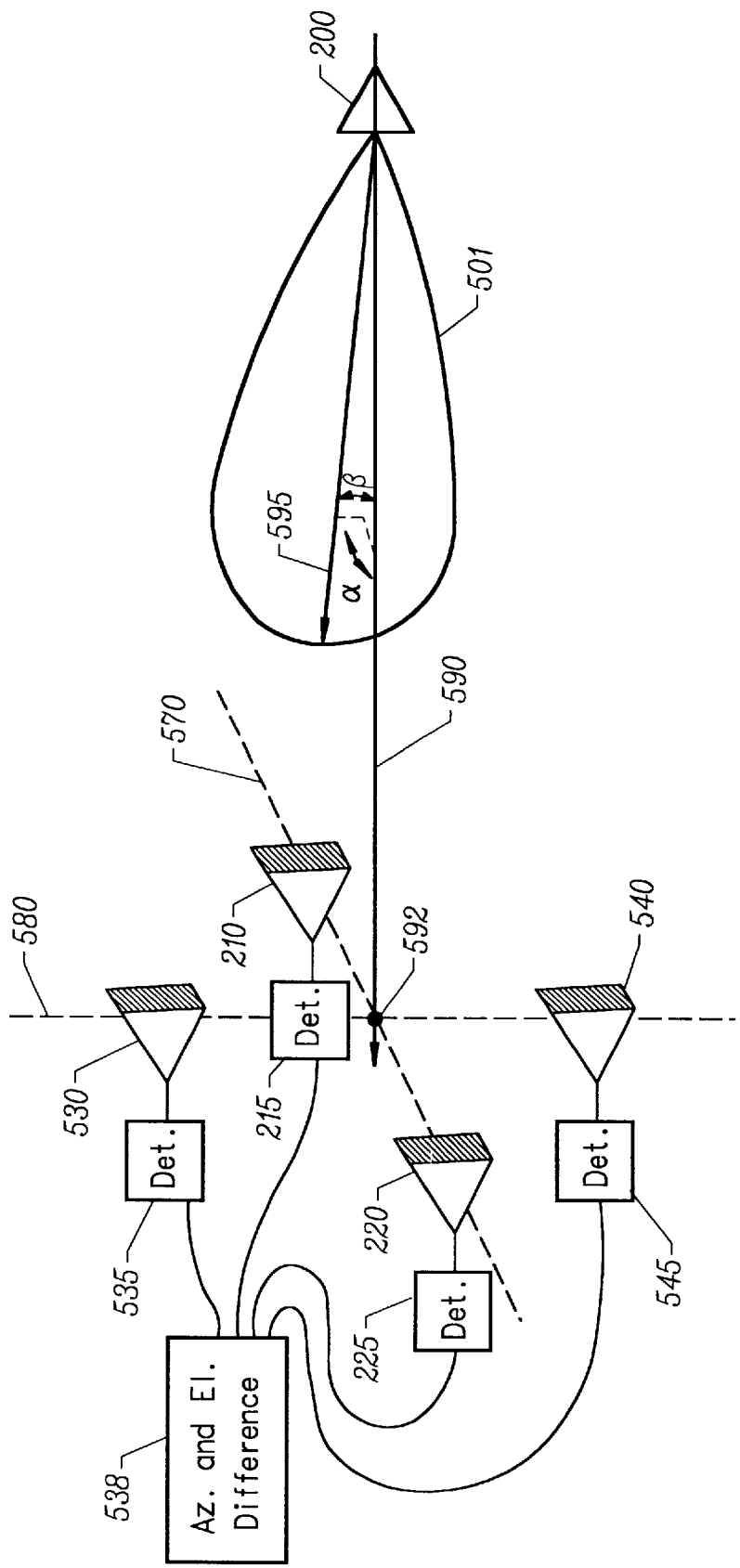
FIG. 5 illustrates the use of additional receive antennas to adjust the automotive radar antenna boresite in both azimuth and elevation.

FIG. 5 shows the use of elevation alignment receive antennas 530 and 540 which may be used in combination with the receive antennas 210 and 220 of FIG. 2 used for azimuth boresite angle alignment. As with the receive antennas 210 and 220 of FIG. 2 which are placed along an azimuth axis 570, the elevation receive antennas 530 and 540 are separated from each other by a known distance along the elevation axis 580.

In FIG. 5, the radar antenna 200 shown exhibits a boresite elevation misalignment angle $\alpha$ with respect to the vehicle thrust vector 590, as well as an elevation angle $\beta$ with respect to the vehicle thrust vector. To set the angles $\alpha$ and $\beta$ to zero, a test signal 501 is first emitted from the radar antenna 200. After detecting the test signal, detectors 215, 225, 535, and 545 then provide amplitude signals to a device 538 for providing azimuth and elevation difference signals. The device 538 can simply include subtractors for taking the difference signals. Summers, multipliers, and dividers may also be included to provide sum*difference and sum/difference signals for both elevation and azimuth.

To set the elevation boresite angle β to 0, the radar antenna 200 is adjusted until the elevation difference signal taken from the outputs of the detectors 535 and 545 is a minimum. Similarly, if a sum*difference or a sum/difference signal is used, the antenna 200 is adjusted in elevation until the signal is a minimum to set the boresite angle β to 0. Similar adjustments can be made in azimuth to set α to 0 based on the output of detectors 210 and 225 as described with respect to FIG. 2.

The antennas 210, 220, 530 and 540 can be positioned relative to a transponder using a test fixture similar to the test fixture shown in FIG. 2 with the antennas 530 and 540 added. With the elevation and azimuth receive antennas all placed on the test fixture, the azimuth axis 570 preferably intersects the elevation axis 580 at a midpoint 592 such that the antennas 210 and 220 are equidistant from the midpoint 592 and the antennas 530 and 540 are equidistant from the midpoint 592. The test fixture can be aligned so that the vehicle thrust vector 590 will be positioned to further intersect the azimuth axis 570 and the elevation axis 580 at the midpoint 592. Positioning and alignment of the receiving antennas with respect to the radar antenna in FIG. 2 can be performed using a variety of methods as described with respect to FIG. 2.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A method of aligning a bore site angle of an automotive radar antenna with respect to a mechanical reference line from a vehicle, the method comprising the steps of:

positioning a first receiving antenna and a second receiving antenna along a first line, said first and second receiving antennas having centerlines approximately perpendicular to said first line, said first and second receiving antennas being separated along said first line, said first line having a midpoint between said first and second receiving antennas;

positioning said first and second receiving antennas with respect to said radar antenna such that a centerline of said radar antenna approximately intersects said midpoint of said first line, wherein said centerline of said radar antenna is approximately perpendicular to said first line and approximately parallel to said mechanical reference line;

transmitting a radar signal from said radar antenna;

measuring a first signal received by said first receiving antenna in response to said radar signal;

measuring a second signal received by said second receiving antenna in response to said radar signal;

generating a third signal indicating a difference between said first and second signals; and adjusting said radar antenna until said third signal is a minimum.

2. The method of claim 1 further comprising the steps of:

determining a sum of said first and second signals; and multiplying said sum by said difference to generate said third signal prior to said adjusting step.

3. The method of claim 1, further comprising the steps of:

determining a sum of said first and second signals; and dividing said sum by said difference to generate said third signal prior to said adjusting step.

4. The method of claim 1, wherein the step of positioning said first and second receiving antennas with respect to said radar antenna comprises the steps of:

providing a first laser beam approximately perpendicular to an axle of the automobile; and moving an alignment fixture supporting the first and second receiving antennas and determining when the light from the first laser beam is reflected from a first reflective material on the alignment fixture.

5. The method of claim 4, further comprising the steps of:

providing a second laser beam from the automobile aligned approximately parallel with the centerline of the radar antenna; and removing translation errors by moving the alignment fixture and determining when the light from a second laser beam is reflected from a second reflective material on the alignment fixture.

6. The method of claim 1, wherein the mechanical reference line comprises a thrust vector of the automobile.

7. A test system for aligning a bore site angle of an automotive radar antenna with respect to a mechanical reference line from a vehicle comprising:

an alignment fixture;

a first receiving antenna attached to said alignment fixture;

a second receiving antenna attached to said alignment fixture, wherein the first and second receiving antennas are approximately equidistant from the centerline of the antenna alignment system;

a first detector having an input coupled to the first receiving antenna, and having an output, the first detector for detecting an amplitude of a first signal from the radar antenna as received by said first receiving antenna;

a second detector having an input coupled to the first receiving antenna, and having an output, the second detector for detecting an amplitude of the first signal from the radar antenna as received by said second receiving antenna;

a subtractor having inputs coupled to outputs of the first and second detectors, and having an output; and a display coupled to the output of the subtractor enabling monitoring of the output from said subtractor.

8. The test system of claim 7 further comprising:

a summer having inputs coupled to the outputs of the first and second detectors, and having an output; and a multiplier having inputs coupled to the outputs of the subtractor and said summer, and having an output coupled to the display to enable monitoring of the output from said multiplier.

9. The test system of claim 7 further comprising:

a summer having inputs coupled to the outputs of the first and second detectors, and having an output; and a divider having inputs coupled to the outputs of the subtractor and the summer, and having an output coupled to the display to enable monitoring of the output of the divider.

10. The test system of claim 7 further comprising:

a first reflective material positioned on the alignment fixture so that a laser beam when aligned approximately perpendicular to the automobile wheel axle when reflected from the first reflective material will position the transponder approximately along the thrust vector of the vehicle; and a second reflective material positioned on the alignment fixture so that a laser beam aligned approximately parallel to a centerline of the automotive radar antenna when reflected from the second reflective material will remove translation errors between the centerline of the radar antenna and a centerline of an antenna of the transponder.

11. A method of aligning a bore site angle of an automotive radar antenna with respect to a mechanical reference line from a vehicle, the method comprising the steps of:

positioning a first receiving antenna and a second receiving antenna along a first line, said first and second receiving antennas having centerlines approximately perpendicular to said first line, said first and second receiving antennas being separated along said first line, said first line having a first midpoint between said first and second receiving antennas;

positioning a third receiving antenna and a fourth receiving antenna along a second line, said second and third receiving antennas having centerlines approximately perpendicular to said second line, said third and fourth receiving antennas being separated along said second line, said second line having a second midpoint between said third and fourth receiving antennas, said second line intersecting said first line at a nexus of said second and first midpoints;

positioning said first, second, third, and fourth receiving antennas with respect to said radar antenna such that a centerline of said radar antenna approximately intersects said nexus of midpoints, wherein said centerline of said radar antenna is approximately perpendicular to said first and second lines and is approximately parallel to said mechanical reference line;

transmitting a test signal from said radar antenna;

measuring a first signal received by said first receiving antenna in response to said test signal;

measuring a second signal received by said second receiving antenna in response to said test signal;

measuring a third signal received by said third receiving antenna in response to said test signal;

measuring a fourth signal received by said fourth receiving antenna in response to said test signal;

generating a fifth signal indicating a first difference between said first and second signals;

generating a sixth signal indicating a second difference between said third and fourth signals;

adjusting said radar antenna until said fifth signal is a minimum; and adjusting said radar antenna until said sixth signal is a minimum.

12. The method of claim 11 further comprising the steps of:

determining a first sum of said first and second signals;

determining a second sum of said third and fourth signals;

multiplying said first sum by said first difference to generate said fifth signal prior to said first adjusting step; and multiplying said second sum by said second difference to generate said sixth signal prior to said second adjusting step.

13. The method of claim 11 further comprising the steps of:

determining a first sum of said first and second signals;

determining a second sum of said third and fourth signals;

dividing said first sum by said first difference to generate said fifth signal prior to said first adjusting step; and dividing said sum by said difference to generate said sixth signal prior to said second adjusting step.

14. The method of claim 11, wherein the mechanical reference line comprises a thrust vector of the automobile.

15. A test system for aligning a bore site angle of an automotive radar antenna with respect to a mechanical reference line from a vehicle comprising:

an alignment fixture;

a first receiving antenna attached to said alignment fixture;

a second receiving antenna attached to said alignment fixture;

a third receiving antenna attached to said alignment fixture;

a fourth receiving antenna attached to said alignment fixture;

a first detector having an input coupled to the first receiving antenna, and having an output, the first detector for detecting an amplitude of a first signal from the radar antenna as received by said first receiving antenna;

a second detector having an input coupled to the second receiving antenna, and having an output, the second detector for detecting an amplitude of the first signal from the radar antenna as received by said second receiving antenna;

a third detector having an input coupled to the third receiving antenna, and having an output, the third detector for detecting an amplitude of the first signal from the radar antenna as received by said third receiving antenna;

a fourth detector having an input coupled to the fourth receiving antenna, and having an output, the fourth detector for detecting an amplitude of the first signal from the radar antenna as received by said fourth receiving antenna;

a first subtractor having inputs coupled to the outputs from said first and second detectors, and having an output;

a second subtractor having inputs coupled to the outputs from said third and fourth detectors, and having an output; and a display coupled to the outputs of the first and second subtractors for monitoring outputs from the first and second subtractors.

16. The test system of claim 15 further comprising:

a first summer having inputs coupled to the outputs of the first and second detectors, and having an output;

a first multiplier having inputs coupled to the outputs of the first subtractor and said first summer, and having an output coupled to the display to enable monitoring of the output from said first multiplier;

a second summer having inputs coupled to the outputs of the third and fourth detectors, and having an output; and a second multiplier having inputs coupled to the outputs of the second subtractor and said second summer, and having an output coupled to the display to enable monitoring of the output from said second multiplier.

17. The test system of claim 15 further comprising:

a first summer having inputs coupled to the outputs of the first and second detectors, and having an output;

a first divider having inputs coupled to the outputs of the first subtractor and said first summer, and having an output coupled to the display to enable monitoring of the output from said first divider;

a second summer having inputs coupled to the outputs of the third and fourth detectors, and having an output; and a second divider having inputs coupled to the outputs of the second subtractor and said second summer, and having an output coupled to the display to enable monitoring of the output from said second divider.

* * * * *

UNITED STATES PATENT AND TRADEMARK OFFICE
CERTIFICATE OF CORRECTION

PATENT NO. : 6,335,705 B1
DATED : January 1, 2002
INVENTOR(S) : Martin I. Grace, Ramzi Abou-Jaoude and Karam Noujeim It is certified that error appears in the above-identified patent and that said Letters Patent is hereby corrected as shown below:

Column 1,
Line 57, please remove "angles" and insert therefor -- angle $\alpha$ --.

Column 2,
Line 60, please remove "anglea" and insert therefor -- angle $\alpha$ --.

Column 3,
Line 15, please remove "anglea" and insert therefor -- angle $\alpha$ --.
Line 33, please remove "anglea" and insert therefor -- angle $\alpha$ --.
Line 38, please start a new paragraph with the word -- Difference --.
Line 44, please remove "anglea" and insert therefor -- angle $\alpha$ --.
Line 52, please remove "sum difference" and insert therefor -- sum*difference --.

Signed and Sealed this

Nineteenth Day of November, 2002

Attest:

Attesting Officer

JAMES E. ROGAN
Director of the United States Patent and Trademark Office